Figure 1:
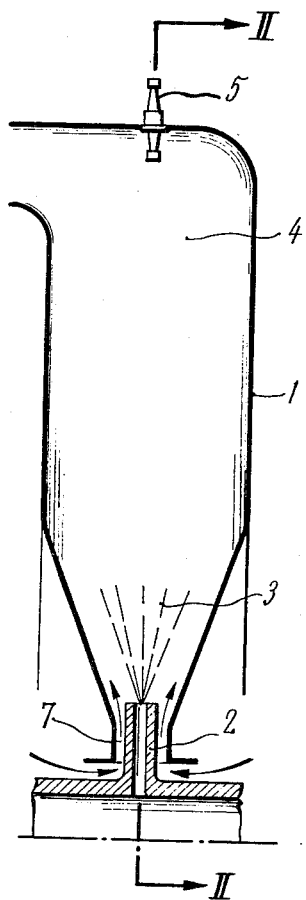

March 8, 1966 K. LARISCH 3,238,720
IGNITION MEANS FOR COMBUSTION CHAMBERS OF GAS TURBINES
Filed June 13, 1962 2 Sheets-Sheet 1

INVENTOR
KURT LARISCH
BY Dicke + Craig
ATTORNEYS

March 8, 1966 K. LARISCH 3,238,720
IGNITION MEANS FOR COMBUSTION CHAMBERS OF GAS TURBINES
Filed June 13, 1962 2 Sheets-Sheet 2

INVENTOR
KURT LARISCH
BY Dicke + Craig
ATTORNEYS

United States Patent Office 3,238,720
Patented Mar. 8, 1966

3,238,720
IGNITION MEANS FOR COMBUSTION CHAMBERS
OF GAS TURBINES
Kurt Larisch, Munich, Germany, assignor to BMW
Triebwerkbau Gesellschaft m.b.H., Munich, Germany
Filed June 13, 1962, Ser. No. 202,142
Claims priority, application Germany, June 19, 1961,
B 62,939
5 Claims. (Cl. 60—39.74)

The present invention relates to a method and arrangement for starting and igniting gas turbines, particularly those gas turbines which essentially consist of a radial or of an axial compressor and of a radial or of an axial turbine, between the rotors of which a fuel injection device is arranged which rotates in unison therewith and by means of which the fuel is injected into an annular combustion chamber subdivided into a primary part in proximity to the axis and into a secondary part adjoining the primary part and extending in the direction toward the outer circumference of the annular combustion chamber.

Gas turbines of the type and construction in which the fuel injection device and the ignition device are arranged at a relatively great distance from one another entail inherent drawbacks inasmuch as, during starting and more particularly during igniting of the gas turbine, only a part of the injected fuel is burnt or combusted in the radially outer part of the combustion chamber with a flame burning under lack of adequate air, which flame is not itself directly capable of immediately igniting the ignitable fuel mixture present in the interior space of the combustion chamber. Only at a higher rotational speed and therewith after a relatively long duration of the starting operation there takes place the so-called complete ignition of the flame usually with an audible explosion, whereupon the combustion takes place only within the radially inner space of the combustion chamber, that is, in proximity to the fuel injection device. However, the belated complete ignition of the fuel results in a relatively slow acceleration of the drive unit from the free-wheeling rotational speed to the operational rotational speed thereof and in a starting operation that will require a relatively long time. Furthermore, as a result thereof, an excessively high temperature results at the turbine outlet and, in some cases, the flame in the combustion chamber is extinguished with an explosion-like attempted completion of the ignition of the gas turbine.

In order to eliminate these drawbacks, the present invention proposes an arrangement in which during starting of the gas turbine or during ignition of an ignition device preferably arranged at the outer circumference of the annular combustion chamber within the area of the secondary combustion chamber part, compressor air reaches the annular combustion chamber through a pipe or tube also arranged at the outer circumference of the annular combustion chamber, whereby the compressor air flows through a flame burning under lack of adequate air in the secondary part of the annular combustion chamber and thus form an oxygen-enriched flame torch directed toward the combustion chamber inner space, which ignites the fuel-rich mixture present in the primary part of the annular combustion chamber.

The present invention further proposes that the pipe or conduit for supplying the compressor air be arranged at the outer circumference of the annular combustion chamber behind the ignition device as viewed in the direction of rotation of the fuel injection device, essentially in the same plane as the ignition device, and extends a short distance radially into the annular combustion chamber. The selection of the position for the compressor air pipe or tube behind the ignition as viewed in the direction of rotation of the fuel injection device is made in the manner as, after ignition, the first flame is produced behind the ignition device in the direction of rotation.

The advantages of the present invention are considered to reside in particular in the fact that a method as well as apparatus for starting and igniting gas turbines is created thereby without considerable constructional or structural expenditures which operates with a minimum of disturbances or failures and needs practically no servicing by reason of the simple structure of the overall installation. Additionally, when utilizing the method proposed by the present invention, the complete ignition takes place already at substantially lower speeds than is the case in the prior art gas turbines mentioned hereinabove, which is of great importance in connection with several possibilities of application of the gas turbines, for example, for the drive of fire-extinguishing pumps which must be in operational readiness as rapidly as is possible.

Accordingly, it is an object of the present invention to provide a method and apparatus enabling implementation of such method for starting and igniting gas turbine drive units of the type described hereinabove which obviates the inadequacies and shortcomings of the prior art constructions.

It is another object of the present invention to provide a method and apparatus for completing the ignition operation and therewith the starting operation in gas turbine units in a relatively short period of time, thereby preventing excessive temperatures at the turbine outlet, the danger of flame-outs due to explosions occurring within the combustion chamber, and simultaneously therewith reducing the time required for accelerating the gas turbine from the free-wheeling rotational speed to the operational speed thereof.

Still a further object of the present invention resides in the provision of a method and apparatus for effecting a relatively rapid complete ignition of the ignition process throughout the entire combustion space of gas turbine units by extremely simple and inexpensive means.

Another object of the present invention resides in a starting and ignition method for gas turbine units and apparatus to enable implementation of such method which permits attainment of the aforementioned advantages without incurring considerable expenditures as regards structure, assembly and manufacturing costs.

Still a further object of the present invention resides in the provision of a gas turbine unit provided with an ignition and starting system so constructed and arranged that the ignition rapidly shifts from an area in proximity to the ignition device to a second area located in proximity to the fuel injection device and spaced, particularly in the radially inward direction from the ignition device.

Figure 2:
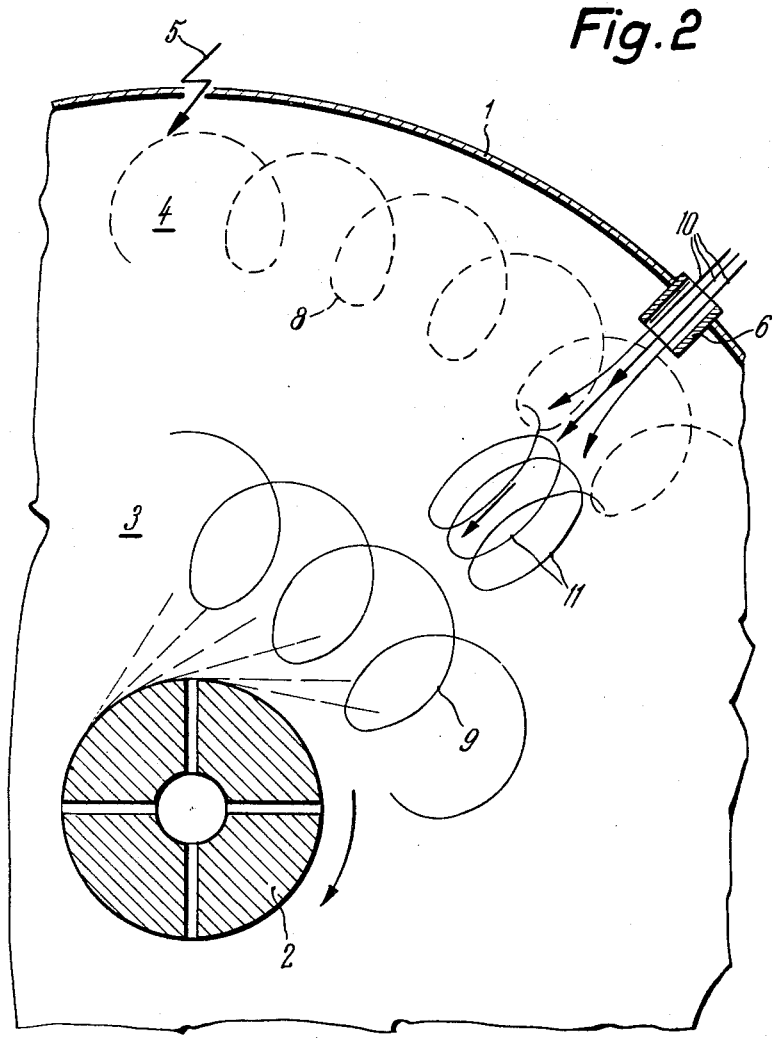

These and other objects, features and advantages of the present invention will become more obvious from the following description when taken in connection with the accompanying drawing, which shows, for purposes of illustration only, one embodiment in accordance with the present invention, and wherein:

FIGURE 1 is a somewhat schematic longitudinal cross-sectional view through a gas turbine in accordance with the present invention within the zone thereof of the annular combustion chamber thereof, and FIGURE 2 is a transverse cross-sectional view, on an enlarged scale, through the gas turbine of FIGURE 1, taken along line II—II.

Referring now to the drawing, wherein like reference numerals are used throughout the two views to designate like parts, reference numeral 1 designates therein an annular combustion chamber. A fuel injection device 2 of any conventional construction rotating in unison with the gas turbine, for example, a rotating atomizer disc, is arranged in the gas turbine between a radial compressor (not shown) and a radial turbine (not shown), by means of which the fuel required for the operation of the gas turbine is injected into the annular combustion chamber 1. The annular combustion chamber 1 itself is subdivided into a primary combustion chamber part 3 located in proximity to the fuel injection device 2, and into a secondary combustion chamber part 4 adjoining the primary part 3 and extending to the outer circumference of the annular combustion chamber 1. An ignition device 5 of any conventional construction as well as a tubular member 6 are arranged along the outer circumference of the annular combustion chamber 1. As viewed in the direction of rotation of the fuel injection device 2, the tubular member 6 is arranged to the rear of the ignition device 5, essentially in the same plane as the ignition device 5, and extends a short distance radially inwardly into the annular combustion chamber 1. The air supplied by the compressor flows, in a manner well known in the gas turbine art, about the entire annular combustion chamber. It enters the primary combustion chamber part 3 through a gap 7 on both sides of the fuel injection device 2 and part of it is introduced into the secondary combustion chamber part 4 through the tubular member 6 from which it issues radially inwardly in the form of a jet or stream of air 10.

*Operation*

The operation of the method and apparatus according to the present invention is as follows:

During starting of the gas turbine or igniting of the ignition device 5, a flame 8 burning under lack of adequate air is produced in the secondary part 4 of the annular combustion chamber 1 in proximity to the ignition device 5; however, this flame 8 is not capable of igniting the fuel-rich mixture 9 present in the primary part 3 of the annular combustion chamber 1. In order to enable ignition of the fuel-rich mixture 9, compressor air is supplied, in the form of an air jet or air stream 10 to the flame 8 burning under lack of adequate air through the tubular member 6, whereby there is produced an oxygen-enriched flame jet or flame torch 11 directed toward the inner space, i.e., toward the primary part 3 of the combustion chamber 1 which completely ignites the fuel-rich mixture 9 present in the primary part 3. The starting operation is thus terminated. The combustion takes place thereafter in the primary part 3 of the annular combustion chamber 1. Accordingly, after ignition, at first a combustion zone is effectively created in the secondary combustion chamber part 4 while after complete ignition, the combustion zone is located in the primary combustion chamber part 3, i.e., in proximity to the injection device 2.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

I claim:

1. A combustion chamber for gas turbines having a substantially annularly shaped combustion chamber effectively forming a radially outer secondary combustion space portion adjoined by a radially inner primary combustion space portion, fuel injection means in one of said portions for injecting a fuel-rich mixture into said combustion chamber, ignition means in the other of said portions for igniting the fuel during starting of the turbine, and auxiliary means disposed in said other combustion space portion for providing during initial ignition of said gas turbine, an oxygen-enriched flame jet directed from said other combustion space portion toward said one combustion space portion which ignites the fuel-rich mixture present therein, said auxiliary means being disposed to the rear of said ignition means as viewed in the direction of rotation of said injection means and substantially in the same plane as said fuel injection means.

2. A combustion chamber for gas turbines, of substantially annular shape and having substantially radially outwardly directed gas flow therethrough, adapted to be supplied with combustion air by a compressor, comprising a radially inner primary combustion space portion adjoined by a radially outer secondary combustion space portion, rotary fuel injuection means in said radially inner combustion space portion for injecting fuel into said combustion chamber in the direction toward said radially outer secondary combustion space portion, air inlet means on both sides of said fuel injection means for supplying combustion air to said combustion chamber in the direction toward said radially outer secondary combustion space portion, ignition means in said radially outer secondary combustion space portion for igniting the fuel during starting of the gas turbine, and auxiliary means disposed in said secondary combustion space portion for introducing additional combustion air to said combustion chamber in the direction toward said radially inner primary combustion space portion in such a manner that it traverses the flame burning in said secondary combustion space portion under lack of adequate air and thereby forms an oxygen-enriched flame front directed toward said radially inner combustion space portion which ignites the fuel-rich mixture present therein.

3. A combustion chamber for gas turbines, of substantially annular shape and having substantially radially outwardly directed gas flow therethrough, adapted to be supplied with combustion air by a compressor, comprising a radially inner primary combustion space portion adjoined by a radially outer secondary combustion space portion, rotary fuel injection means in said radially inner combustion space portion for injecting fuel into said combustion chamber in the direction toward said radially outer secondary combustion space portion, air inlet means on both sides of said fuel injection means for supplying combustion air to said combustion chamber in the direction toward said radially outer secondary combustion space portion, ignition means in said radially outer secondary combustion space portion for igniting the fuel during starting of the gas turbine, and auxiliary means disposed in said secondary combustion space portion for introducing additional combustion air to said combustion chamber in the direction toward said radially inner primary combustion space portion in such a manner that it traverses the flame burning in said secondary combustion space portion under lack of adequate air and thereby forms an oxygen-enriched flame front directed toward said radially inner combustion space portion which ignites the fuel-rich mixture present therein, said auxiliary means including a tubular element and being disposed to the rear of said ignition means as viewed in the direction of rotation of said rotary fuel injection means and substantially in the same plane as said fuel injection means.

4. A combustion chamber for gas turbines, of substantially annular shape and having substantially radially outwardly directed gas flow therethrough, adapted to be supplied with combustion air by a compressor, comprising a radially inner primary combustion space portion adjoined by a radially outer secondary combustion space portion, rotary fuel injection means in said radially inner combustion space portion for injecting fuel into said combustion chamber in the direction toward said radially outer secondary combustion space portion, air inlet means on both sides of said fuel injection means for supplying combustion air to said combustion chamber in the direction toward said radially outer secondary combustion space portion, ignition means in said radially outer secondary combustion space portion for igniting the fuel during starting of the gas turbine, and auxiliary means disposed in said secondary combustion space portion for introducing additional combustion air to said combustion chamber in the direction toward said radially inner primary combustion space portion in such a manner that it traverses the flame burning in said secondary combustion space portion under lack of adequate air and thereby forms an oxygen-enriched flame front directed toward said radially inner combustion space portion which ignites the fuel-rich mixture present therein, said auxiliary means including a tubular element and being disposed to the rear of said ignition means as viewed in the direction of rotation of said rotary fuel injection means and substantially in the same plane as said fuel injection means, and said tubular element extending a short distance substantially radially into said annular combustion chamber.

5. A method for starting and igniting gas turbines, particularly gas turbines of the type having an annular combustion chamber with substantially radially outwardly directed gas flow therethrough having a radially inner primary combustion space portion adjoined by a radially outer secondary combustion space portion, a rotating fuel injection device arranged in said primary combustion space portion for injecting a fuel-rich mixture into said combustion chamber to be ignited by an ignition device, the method comprising the steps of producing, during starting of the gas turbine, a flame burning in the secondary combustion space portion under lack of adequate air, forming an oxygen-enriched flame jet at the outer circumference of said combustion chamber directed toward the radially inner primary combustion space portion by supplying compressed air to the combustion chamber within the region of the secondary combustion space and substantially in the same plane as and to the rear of the ignition device as viewed in the direction of rotation of the fuel injection device in a direction radially inward through said flame burning under lack of adequate air, and thereupon rapidly and completely igniting the fuel-rich mixture present in the primary combustion space portion.

References Cited by the Examiner
UNITED STATES PATENTS

| | | | |
|---|---|---|---|
| 2,595,505 | 5/1952 | Bachle | 60—39.74 |
| 2,720,750 | 10/1955 | Schelp | 60—39.74 |
| 2,827,759 | 3/1958 | Bruckmann | 60—39.74 |
| 2,924,937 | 2/1960 | Leibach | 60—39.74 |
| 3,018,625 | 1/1962 | Bachle | 60—39.65 |

SAMUEL LEVINE, *Primary Examiner.*